(12) United States Patent
Sindoni, Jr.

(10) Patent No.: US 10,029,599 B2
(45) Date of Patent: Jul. 24, 2018

(54) COLLAPSIBLE TAILGATE LADDER AND RAMP

(71) Applicant: Michael J. Sindoni, Jr., Delanson, NY (US)

(72) Inventor: Michael J. Sindoni, Jr., Delanson, NY (US)

( * ) Notice: Subject to any disclaimer, the term of this patent is extended or adjusted under 35 U.S.C. 154(b) by 1 day.

(21) Appl. No.: 15/206,293

(22) Filed: Jul. 10, 2016

(65) Prior Publication Data

US 2018/0009358 A1  Jan. 11, 2018

(51) Int. Cl.

| *B60P 1/43* | (2006.01) |
|---|---|
| *B60R 3/02* | (2006.01) |
| *E06C 5/04* | (2006.01) |
| *B62D 33/027* | (2006.01) |

(52) U.S. Cl.
CPC ............ *B60P 1/435* (2013.01); *B60R 3/02* (2013.01); *B62D 33/0273* (2013.01); *E06C 5/04* (2013.01)

(58) Field of Classification Search
CPC .. B60P 1/435; B60P 1/43; B60P 1/438; B60P 3/07; B60P 1/431; B60P 3/40; B60P 1/26; B60P 1/433; B60P 1/02; B60P 3/122; B62D 33/0273; B62D 33/03; B62D 33/02; B62D 33/04; B62D 21/14; B62D 33/027; B62D 63/061; B62D 21/20; B62D 33/10; B60R 3/02; B60R 11/00; B60R 11/02; B60R 9/06; B60R 9/065; E05C 17/025
USPC ..... 296/61, 57.1, 146.8, 26.08, 26.1, 62, 59, 296/50, 51, 165, 156, 164; 14/69.5, 71.1, 14/71.3, 71.5; 414/537, 921, 462, 469, 414/718, 813
See application file for complete search history.

(56) References Cited

U.S. PATENT DOCUMENTS

| 5,205,603 | A | * | 4/1993 | Burdette, Jr. | ............. | B60R 3/02 |
|---|---|---|---|---|---|---|
| | | | | | | 182/195 |
| 5,312,148 | A | * | 5/1994 | Morgan | .................. | B60P 1/435 |
| | | | | | | 296/61 |
| 5,649,732 | A | * | 7/1997 | Jordan | ....................... | B60P 1/43 |
| | | | | | | 296/26.1 |
| 6,250,874 | B1 | * | 6/2001 | Cross | ......................... | B60P 1/43 |
| | | | | | | 296/61 |
| 6,536,822 | B1 | * | 3/2003 | Vagedes | .................. | B60P 1/435 |
| | | | | | | 296/26.08 |
| 6,811,067 | B2 | * | 11/2004 | Muizelaar | ............ | B62D 33/027 |
| | | | | | | 224/404 |
| D505,238 | S | * | 5/2005 | Robertson | ....................... | D34/32 |
| D528,065 | S | * | 9/2006 | Ezra | ............................ | D12/408 |

(Continued)

*Primary Examiner* — D Glenn Dayoan
*Assistant Examiner* — Sunsurraye Westbrook
(74) *Attorney, Agent, or Firm* — Hoffman Warnick LLC (57) ABSTRACT

Embodiments of the invention related generally to ladders and ramps and, more particularly, to collapsible ladders and ramps for a vehicle tailgate and related systems. In one embodiment, the invention provides a system comprising: a tailgate member for a vehicle, the tailgate member having: an interior wall; an exterior wall; and a cavity between the interior and exterior walls; at least one collapsible ladder device comprising: a pair of substantially parallel elongate members; a plurality of cross members, each of the plurality extending between and lying substantially perpendicular to the pair of substantially elongate members; and an attachment device for non-fixedly securing the at least one collapsible ladder device within the cavity of the tailgate member.

14 Claims, 6 Drawing Sheets

(56) References Cited

U.S. PATENT DOCUMENTS

| | | | |
|---|---|---|---|
| 7,258,384 B2 * | 8/2007 | Drabik | B60P 1/435 14/69.5 |
| 8,182,013 B1 * | 5/2012 | Alvarado | B60R 3/007 182/127 |
| 8,991,894 B2 * | 3/2015 | Smith | B60R 9/065 296/100.09 |
| 2004/0032142 A1 * | 2/2004 | Sherrer | B60P 1/435 296/61 |
| 2011/0168491 A1 * | 7/2011 | Cheatham, Jr. | E06C 7/182 182/106 |

* cited by examiner

COLLAPSIBLE TAILGATE LADDER AND RAMP

BACKGROUND

Embodiments of the invention related generally to ladders and ramps and, more particularly, to collapsible ladders and ramps for a vehicle tailgate and related systems.

BRIEF DESCRIPTION OF THE INVENTION

In one embodiment, the invention provides a system comprising: a tailgate member for a vehicle, the tailgate member having: an interior wall; an exterior wall; and a cavity between the interior and exterior walls; at least one collapsible ladder device comprising: a pair of substantially parallel elongate members; a plurality of cross members, each of the plurality extending between and lying substantially perpendicular to the pair of substantially elongate members; and an attachment device for non-fixedly securing the at least one collapsible ladder device within the cavity of the tailgate member.

In another embodiment, the invention provides a device comprising: a pair of elongate members; and a plurality of cross members, each of the plurality extending between and lying substantially perpendicular to the pair of elongate members, wherein: each of the pair of elongate members is segmented, with a first segment comprising a first segment of a first elongate member substantially parallel to a first segment of a second elongate member, with at least one of the plurality of cross members disposed therebetween, a second segment of the first elongate member substantially parallel to a second segment of the second elongate member, with at least another of the plurality of cross members disposed therebetween; the second segment, in a collapsed position, lies atop the first segment; and the second segment, in an extended position, lies longitudinally adjacent the first segment.

In still another embodiment, the invention provides a device comprising: a pair of elongate members, each elongate member including: a first portion having: a first outer dimension; and a first interior cavity with a first cavity dimension; a second portion adjacent to the first portion, the second portion having: a second outer dimension less than the first cavity dimension of the first portion; and a second interior cavity with a second cavity dimension; a plurality of cross members, each of the plurality extending between and lying substantially perpendicular to the pair of elongate members, wherein the second portion is configured, in a collapsed position, to reside at least partially within the first interior cavity of the first portion and, in an extended position, to reside longitudinally adjacent the first portion.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
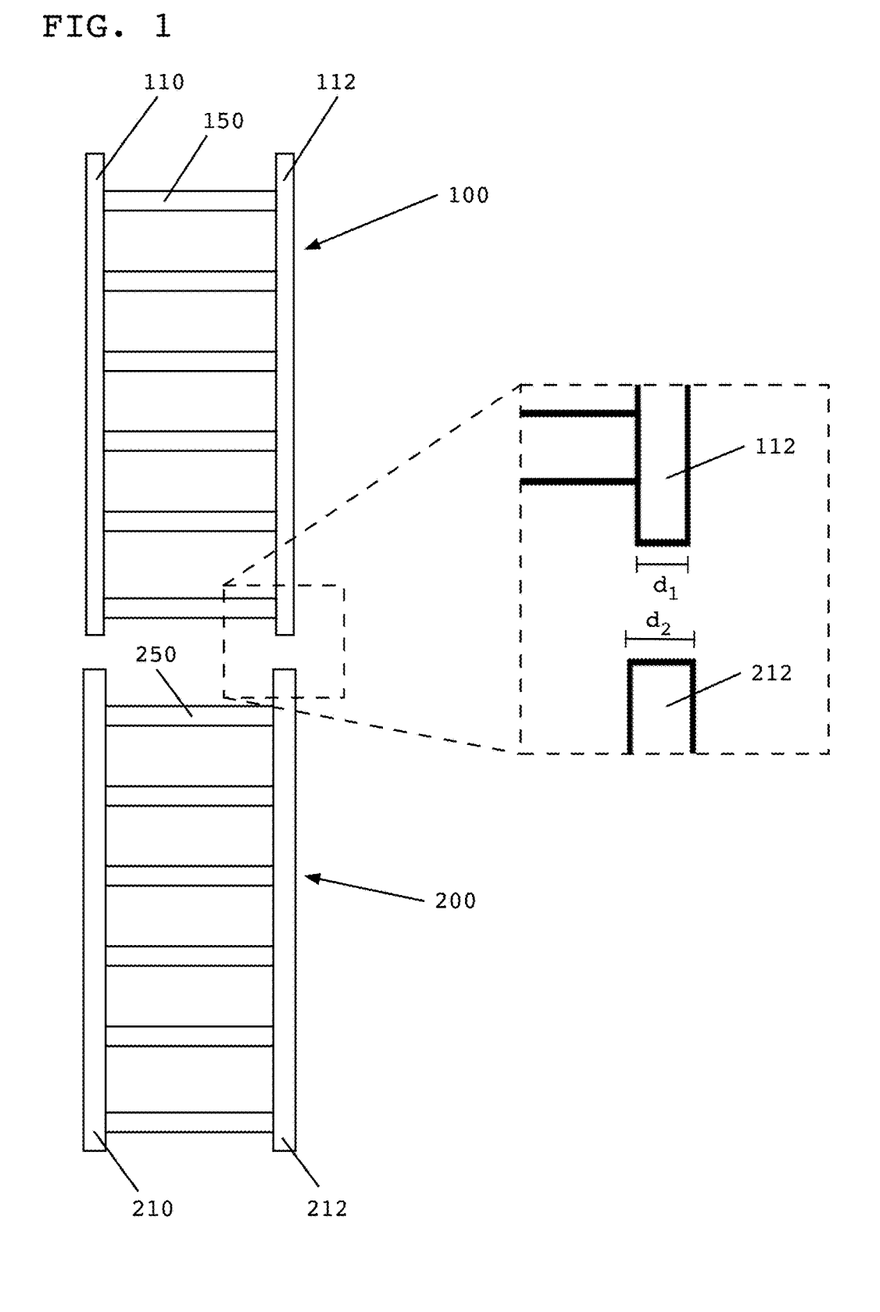
FIG. 1 shows a collapsible tailgate ladder according to an embodiment of the invention.

Referring now to the drawings, FIG. 1 shows a pair of collapsible tailgate ladder sections 100, 200 according to an embodiment of the invention. Tailgate ladder section 100 includes a pair of elongate members 110, 112, between which are disposed a plurality of rungs 150, as will be recognized by one skilled in the art. Tailgate ladder section 200 includes a corresponding pair of elongate members 210, 212 and plurality of rungs 250.

The detailed portion of FIG. 1 shows the juxtaposition of elongate member 112 and elongate member 212. Elongate member 112 has a first diameter, $d_1$, that is less than a second diameter $d_2$ of elongate member 212. As such, at least a portion of elongate member 112 is capable of being disposed within elongate member 212, as will be explained in greater detail below.

Figure 2:
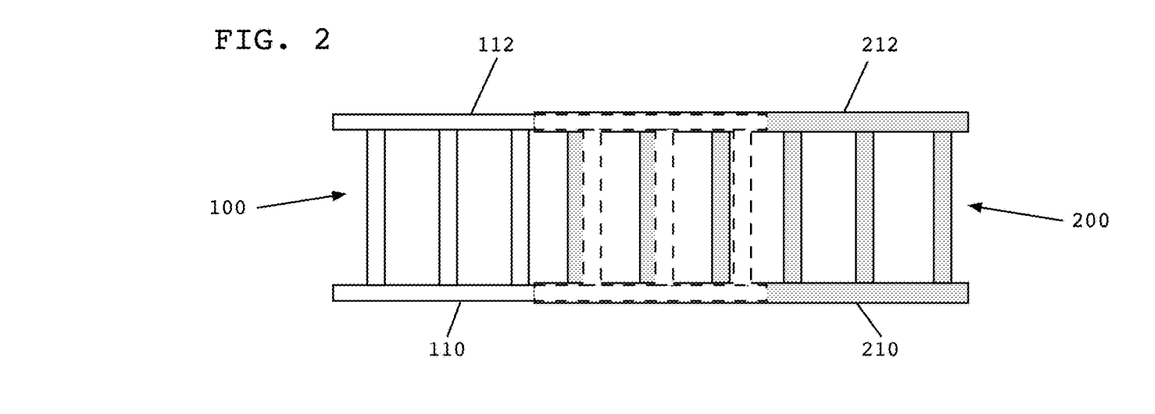
FIG. 2 shows the collapsible tailgate ladder of FIG. 1 in partially collapsed form.

FIG. 2, for example, shows ladder sections 100, 200 in partially collapsed form, such that elongate member 110 of ladder section 100 is disposed within elongate member 210 of ladder section 200 while elongate member 112 of ladder section 100 is similarly disposed within elongate member 212.

Figure 3:
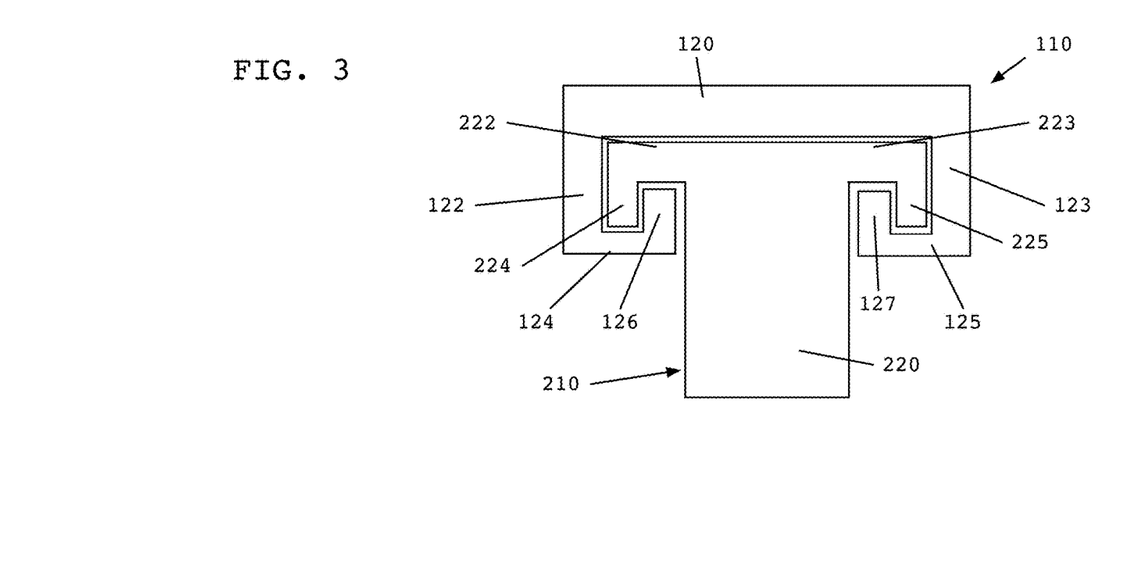
FIG. 3 shows a cross-sectional view of the collapsible tailgate ladder of FIG. 1.

FIG. 3 shows a cross-sectional view elongate members 100, 200 looking along their longitudinal axes, according to one illustrative embodiment of the invention. Elongate member 110 includes a horizontal portion 120, from which descend a pair of vertical members 122, 123. A pair of horizontal members 124, 125 extend medially from vertical members 122, 123 and a pair of rising members 126, 127 extend upward from horizontal members 124, 125. Thus, elongate member 110 roughly forms a "G" shape from each half of elongate member 110.

Elongate member 210 has a different but corresponding shape as compared to elongate member 110. That is, elongate member 210 includes a body 220, from which extend a pair of horizontal members 222, 223. A pair of descending members 224, 225 then descend from horizontal members 222, 223. Thus, elongate member 110 roughly forms a "T" shape that is adapted to and capable of being disposed within elongate member 110, as shown. In this configuration, elongate member 110 of ladder section 100 (FIG. 2) is capable of sliding along and over elongate member 210 of ladder section 200 (FIG. 2), thereby variably adopting extended and collapsed positions.

The particular shapes of elongate members 110, 210 shown in FIG. 3 are merely illustrative. Other shapes may be employed, as will be recognized by one skilled in the art, and are within the scope of the invention.

As will be recognized by one skilled in the art, the movement of ladder sections 100, 200 with respect to one another may be facilitated or eased in any number of ways and with any number of devices. These might include, for example, ball bearings, liquid lubricants, solid lubricants, etc. Merely for the sake of simplicity in explanation, these are not shown in the drawings, but are within the scope of the various embodiments of the invention.

Figure 4:
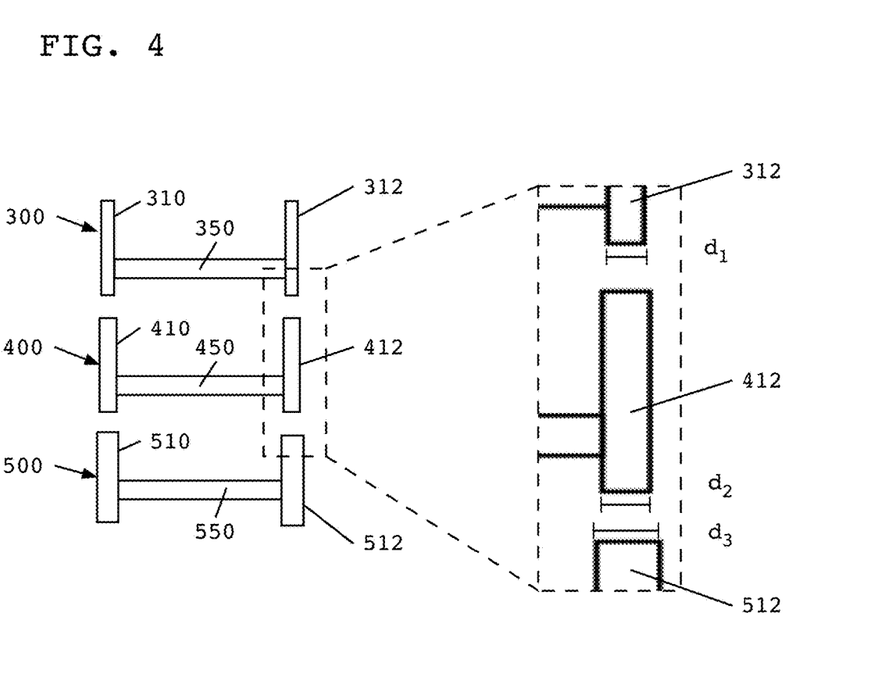
FIG. 4 shows a collapsible tailgate ladder according to another embodiment of the invention.

FIG. 4 shows three tailgate ladder sections 300, 400, 500 according to another embodiment of the invention. Here, each ladder section 300, 400, 500 includes a pair of elongate members 310, 312, and 410, 412, and 510, 512, but a single rung 350, 450, 550, respectively. As will be apparent from the following description, however, more than one rung may be included in each section according to other embodiments of the invention.

Figure 5:
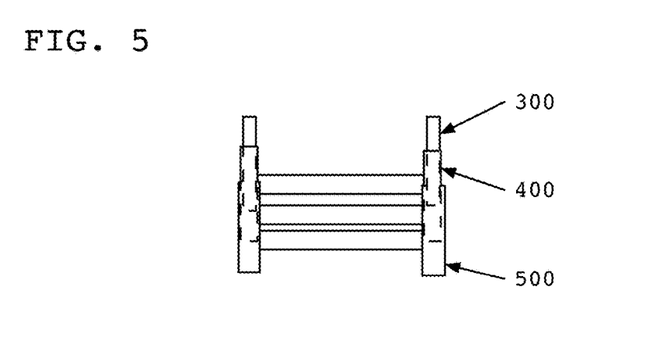
FIG. 5 shows the collapsible tailgate ladder of FIG. 4 in collapsed form.

In the detailed portion of FIG. 1, elongate members 312, 412, 512 have diameters $d_1$, $d_2$, $d_3$, respectively. As in the embodiment shown in FIG. 1, this facilitates the passage of a portion of, for example, elongate member 312 within elongate member 412 and/or elongate member 412 within elongate member 512. FIG. 5 shows tailgate ladder sections 300, 400, 500 in collapsed form.

Figure 6:
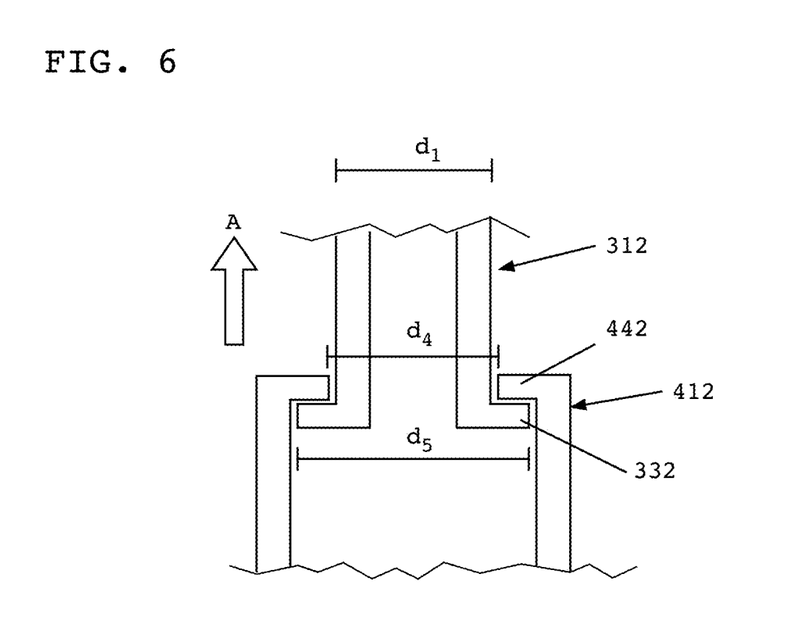
FIG. 6 shows a detailed cross-sectional view of the collapsible tailgate ladder of FIG. 4.

FIG. 6 shows a detailed schematic view of portions of elongate members 312, 412 according to one embodiment of the invention. Elongate member 312 has a first diameter $d_1$ and a greater second diameter $d_5$ across a flange 332 at one end. Elongate member 412 has a corresponding or complimentary shape, including a rim 442 at its end adjacent flange 332. Opening within rim 442 has a diameter, $d_4$, that is greater than first diameter $d_1$ but less than second diameter $d_5$. As such, elongate member 312 may move in direction A within elongate member 412 but is prevented from being removed entirely from within elongate member 412 by the contact of flange 332 and rim 442.

As will be recognized by one skilled in the art, any number of ladder sections may be arranged in series in the manner shown in FIGS. 4-6. The number of such sections shown herein is merely for the sake of simplicity in explanation and illustration and should not be viewed as limiting the scope of the invention.

Figure 7:
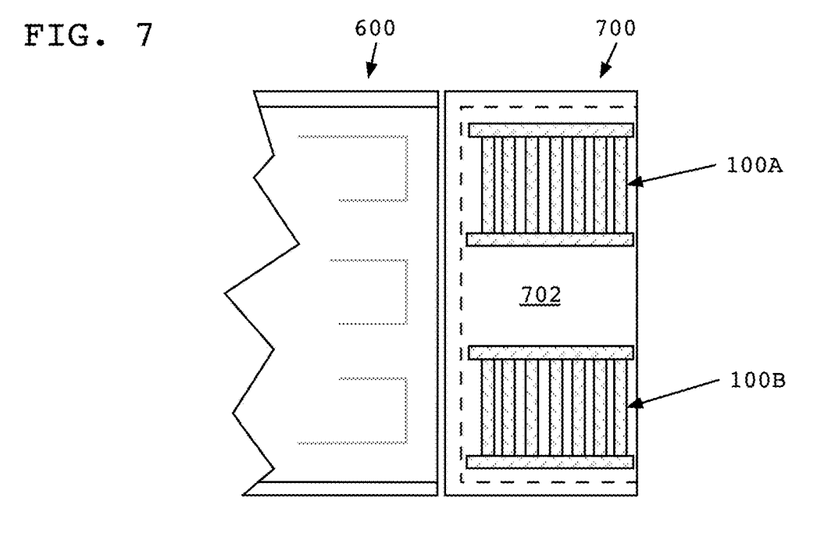
FIG. 7 shows a top-down view of a tailgate including a pair of collapsible tailgate ladders according to an embodiment of the invention.
Figure 8:
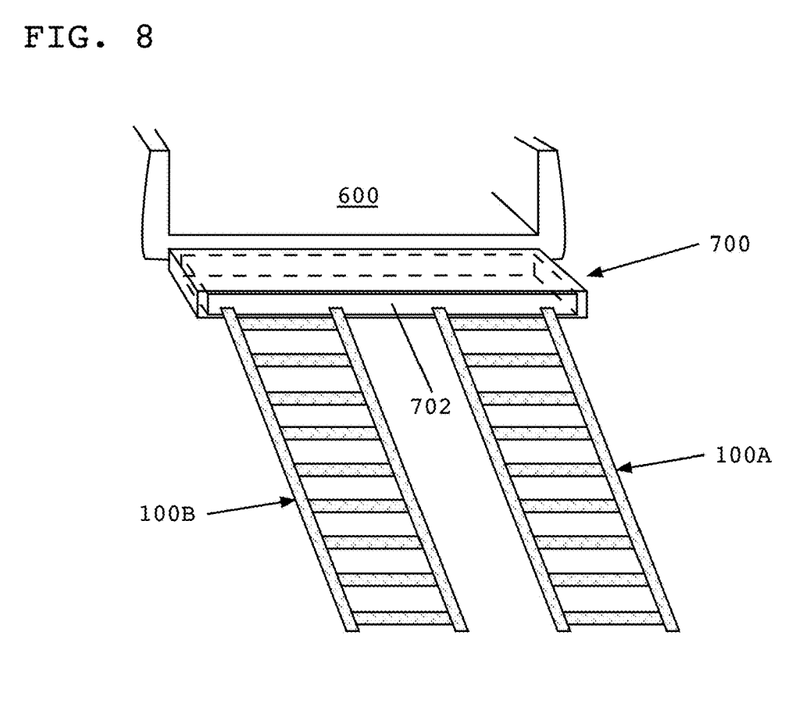
FIG. 8 shows a perspective view of the tailgate of FIG. 7 with the pair of collapsible tailgate ladders in extended form.

FIG. 7 shows a top-down view of a portion of a vehicle bed 600 and a tailgate member 700 according to an embodiment of the invention. Tailgate member 700 includes a cavity 702 into which is disposed a pair of collapsible ladder devices 100A, 100B according to an embodiment of the invention. FIG. 8 shows a perspective view of the tailgate member 700 of FIG. 7 with the collapsible ladder devices 100A, 100B extended from the cavity 702.

As will be understood by one skilled in the art, the components of collapsible ladder devices 100A, 100B may be formed of any material suitable for supporting the weight of a motorcycle, an all-terrain vehicle (ATV), a piece of landscaping equipment, or similar vehicle as it is driven or pushed up collapsible ladder devices 100A, 100B when extended from cavity 702 to the ground.

As will similarly be recognized by one skilled in the art, the number of collapsible ladder devices employed may vary depending on the vehicle to be loaded. For example, where a motorcycle is to be loaded onto vehicle bed 600, a single collapsible ladder device may be employed; where a four-wheeled ATV is to be loaded, a pair of collapsible ladder devices may be employed; and where a three-wheeled ATV is to be loaded, three collapsible ladder devices may be employed. The embodiment shown in FIGS. 7 and 8, which show a system including a pair of collapsible ladder devices 100A, 100B is shown merely for purposes of explanation and illustration.

Figure 9:
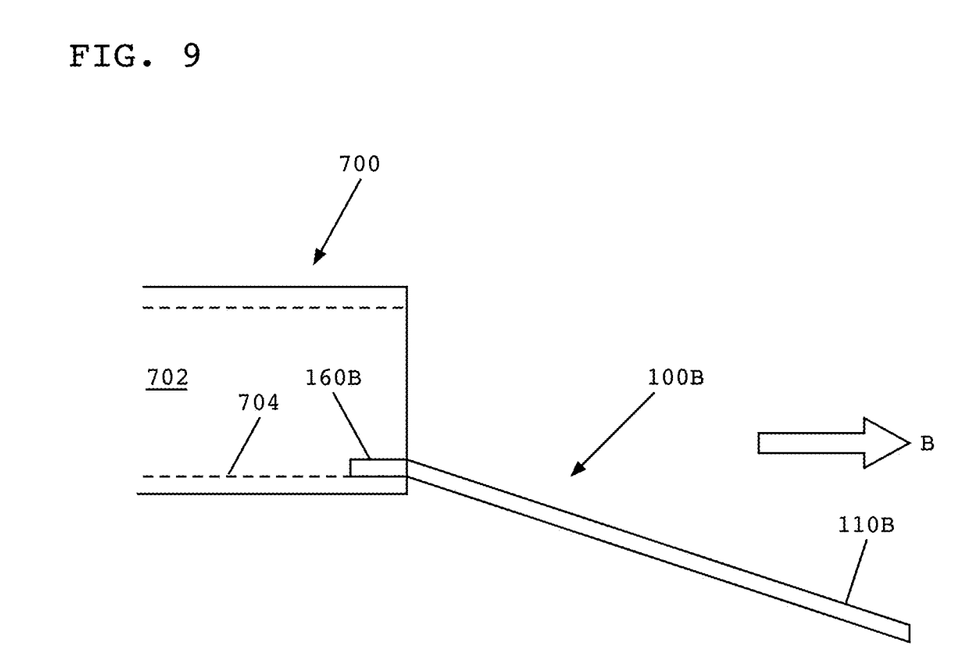
FIG. 9 shows a cross-sectional side view the tailgate and extended tailgate ladder of FIG. 8.

FIG. 9 shows a cross-sectional side view of tailgate member 700 according to one embodiment of the invention. Here, elongate member 110B includes an attachment device 160B in contact with a wall 704 of tailgate member 700 within cavity 702. Attachment device 160B may be operable to non-fixedly secure elongate member 110B (and therefore collapsible ladder device 100B) within cavity 702. According to some embodiments, attachment device 160B is a simple plate or ledge, as shown in FIG. 9, such that attachment device 160B lays atop wall 704. According to other embodiments, attachment device 160B may include a hook, lip, or similar feature operable to prevent movement of collapsible ladder device 100B in direction B.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system comprising:
a tailgate member for a vehicle, the tailgate member having:
an interior wall;
an exterior wall; and
a cavity between the interior and exterior walls;
at least one collapsible ladder device comprising:
a pair of substantially parallel elongate members;
a plurality of cross members, each of the plurality extending between and lying substantially perpendicular to the pair of substantially elongate members; and
an attachment device for non-fixedly securing the at least one collapsible ladder device within the cavity of the tailgate member,
wherein each of the pair of substantially parallel elongate members includes:
a first portion having:
a first outer dimension; and
a first interior cavity with a first cavity dimension;
a second portion adjacent to the first portion, the second portion having:
a second outer dimension less than the first cavity dimension of the first portion; and
a second interior cavity with a second cavity dimension.

2. The system of claim 1, wherein the at least one collapsible ladder device comprises a pair of collapsible ladder devices.

3. The system of claim 1, wherein each of the pair of substantially parallel elongate members is segmented, with a first segment comprising a first segment of a first elongate member substantially parallel to a first segment of a second elongate member, with at least one of the plurality of cross members disposed therebetween, a second segment of the first elongate member substantially parallel to a second segment of the second elongate member, with at least another of the plurality of cross members disposed therebetween.

4. The system of claim 3, wherein the second segment, in a collapsed position, lies atop the first segment.

5. The system of claim 4, wherein, in the collapsed position, a combined length of the first and second segments is not greater than a height of the interior wall or the exterior wall of the tailgate member, such that the collapsible ladder device resides within the cavity of the tailgate member.

6. The system of claim 3, wherein the second segment, in an extended position, lies longitudinally adjacent the first segment.

7. The system of claim 1, wherein the second portion is configured, in a collapsed position, to reside at least partially within the first interior cavity of the first portion.

8. The system of claim 7, wherein, in the collapsed position, a combined length of the first and second portions is not greater than a height of the interior wall or the exterior wall of the tailgate member, such that the collapsible ladder device resides within the cavity of the tailgate member.

9. The system of claim 1, wherein the second portion is configured, in an extended position, to reside longitudinally adjacent the first portion.

10. The system of claim 1, wherein the pair of substantially parallel elongate members further includes:
   a third portion adjacent to the second portion, the third portion having:
      a third outer dimension less than the second cavity dimension of the second portion.

11. The system of claim 1, wherein the attachment device includes a hook or lip adapted to non-fixedly secure the at least one collapsible ladder device to a wall of the cavity of the tailgate member.

12. A device comprising:
   a pair of elongate members, each elongate member including:
      a first portion having:
         a first outer dimension; and
         a first interior cavity with a first cavity dimension;
      a second portion adjacent to the first portion, the second portion having:
         a second outer dimension less than the first cavity dimension of the first portion; and
         a second interior cavity with a second cavity dimension;
   a plurality of cross members, each of the plurality extending between and lying substantially perpendicular to the pair of elongate members,
   wherein the second portion is configured, in a collapsed position, to reside at least partially within the first interior cavity of the first portion and, in an extended position, to reside longitudinally adjacent the first portion.

13. The device of claim 12, wherein the pair of elongate members further includes:
   a third portion adjacent to the second portion, the third portion having:
      a third outer dimension less than the second cavity dimension of the second portion.

14. The device of claim 12, further comprising:
   an attachment device for fixedly or non-fixedly securing the device within a cavity of a tailgate member.

* * * * *